Patented Feb. 4, 1947

2,415,160

UNITED STATES PATENT OFFICE 2,415,160

COATING COMPOSITION

Daniel D. Cameron, Wilmington, Del., assignor to Hercules Powder Company, Wilmington, Del., a corporation of Delaware No Drawing. Application May 19, 1943,
Serial No. 487,663

5 Claims. (Cl. 106—230)

This invention relates to coatings used to render paper, Cellophane and other base materials resistant to the transmission of moisture and moisture vapor, and more particularly it relates to water-impervious coatings for paper comprising certain rosin derivatives.

Heretofore, coatings and particularly hot melt coatings comprising various proportions of wax and rosin have been used as waterproofing films. However, such coatings have been characterized by low viscosity, high penetration into the paper, low bonding strength, and pronounced tack and waxiness leading to smearing and the collecting of dirt on the surface of the coating.

Now in accordance with the present invention, it has been found that coating compositions comprising, a liquid rosin derivative, a rosin derivative having a melting point higher than ordinary rosin, and a waxy substance are moisture and moisture vapor impermeable, flexible, and only very slightly tacky at room temperature. They have suitable viscosity and low penetration into the paper, a minimum amount of waxiness and possess a strong bonding attraction for paper and similar base materials both at room and higher temperatures.

In the preferable practice, the liquid rosin derivative, the rosin derivative having a melting point higher than ordinary rosin, and the waxy substance are united in the molten state. No appreciable differences are incurred whether the components are melted separately and then united, or are mixed in the solid state and then melted, or whether one component is melted and to it one or more components are added in the solid state. All such means are operable under the conception of this invention. Application of the material is made with substances in a molten form and by any of the methods common to the trade for application of "hot melt" materials including dipping, brushing and spraying to base materials such as paper, leather, or Cellophane.

Coated paper sheets prepared by applying the coating in the molten form and spreading with a coating knife were tested for moisture vapor transmission in the following manner: A flanged aluminum vessel was partly filled with water. The coated paper was placed, coated side down toward the water, on top of the vessel. On top of the paper, an aluminum ring was placed and bolted securely to the flange of the vessel. Suitable gaskets were provided both between the flange and the paper and between the paper and the ring. The assembled vessel and paper were placed in an atmosphere of 50% relative humidity and at 75° F. Under these conditions, air was passed over the surface of the vessel. The assembled vessel was left in this position for a definite period of time, weighed, allowed to stand for an additional 24 hours and again weighed. The loss of weight represented the transmission of water vapor.

The following examples are given by way of illustration of the described moisture resistant coating.

Example 1

120 parts of high calcium content calcium rosinate (melting range 155–225° C.) were melted and to it 60 parts of hydrogenated methyl abietate were added. The two were thoroughly mixed, cooled to approximately 130° C., and to the mixture 20 parts of paraffin having a melting point of 140° F. were added. The composition was applied in the molten form to paper and spread with a coating knife to give sheets with coatings of 10 lbs. per 3000 square feet of paper. The moisture vapor transmission was measured by the above-described method and found to be 0.4 gram per 100 square inches per 24 hours.

Example 2

100 parts of high calcium content calcium rosinate (melting range 150–225° C.) were melted, and to it were added 80 parts of methyl abietate. The mixture was cooled to approximately 130° C., and 20 parts of paraffin having a melting point of 140° F. were added. The molten composition was applied to paper to give a coating of 10 lbs. per 3000 square feet of paper. The paper was tested for moisture vapor transmission and showed a value of 0.9 gram per 100 square inches per 24 hours.

Example 3

100 parts of high calcium content rosinate (melting range 150–225° C.) were melted, and 80 parts of partially decarboxylated rosin were added. The decarboxylated rosin, which is liquid at room temperature, was prepared by heating rosin at 275–300° C. in the presence of 0.1% of p-toluene sulfonic acid until the rosin possessed an acid number of 105. The blended material was cooled to approximately 130° C., and 20 parts of paraffin having a melting point of 140° F. were added. The molten material was applied to paper to give a coating of 10 lbs. per 3000 square feet of paper. The paper was tested for moisture vapor transmission and showed a value of 0.4 gram per 100 square inches per 24 hours.

The rosin derivatives having melting points higher than ordinary rosin found desirable for use in this invention are high melting metallic rosinates and high melting hydrogenated metallic rosinates. The metallic rosinates include the rosinates of calcium, iron, copper, cobalt, zinc, manganese, lead, barium, cadmium and, in general, the metallic rosinates prepared from bivalent metals. The hydrogenated metallic rosinates include hydrogenated barium, calcium, iron, copper, zinc, cobalt, manganese, lead, and cadmium rosinates, and, in general, the metallic hydrogenated rosinates prepared from bivalent metals.

The liquid rosin derivatives that have been found usable in this invention include the liquid esters of abietic acid, the liquid hydrogenated esters of abietic acid, and decarboxylated rosin.

Although paraffin wax is to be preferred since it is common and readily available, other moistureproofing waxes or wax-like materials may be used, such as ceresin wax, Japan wax, spermaceti, beeswax, and petroleum jelly.

The quantities of the various components present will be dictated by the desired balance between the properties of flexibility, tack, bonding, and moisture vapor resistance. By operating in various proportions, it is possible to vary the characteristics of the material from the very tacky surface desired of an adhesive to the substantially tack-free surface desired of finish coatings, without decreasing the flexibility. The amounts present will vary from about 35 to about 80% by weight of the high melting rosin derivative, and preferably from about 45 to about 65%.

The liquid rosin derivative will be present from about 20 to about 65% by weight, and preferably from about 30 to about 50%. The waxy substance will vary from about 2 to about 40% by weight, and preferably from about 6 to about 15%.

While all of the above examples have described a hot melt method of application which is preferable, the coating may be dissolved in a suitable solvent and then applied to the base material with subsequent high temperature drying. An alternate method of application comprises dispersing the coating in a suitable liquid together with an emulsifying agent and applying in an emulsion form. While the emulsifying agent used may be any of the commonly employed protective colloids, casein has been found to be particularly effective.

The ternary component composition has the property of being water resistant while at the same time being flexible, and heat resistant. In addition, the coating described by this invention has a very high bonding strength and can be used for the lamination of flexible sheets, such as paper, Cellophane, or other materials. It has a low penetration into the coated base material resulting in a saving of coating composition, since a smaller amount will produce an effective moisture resistant film. It has the property of being extremely flexible, allowing the coated paper or Cellophane to be used for wrapping purposes without cracking or chipping of the coating.

Thus, the present invention has described a new and useful coating comprising a liquid rosin derivative, a rosin derivative having a melting point higher than ordinary rosin, and a waxy substance which when applied to a base material renders it resistant to the transmission of moisture and moisture vapor.

What I claim and desire to protect by Letters Patent is:

1. A moisture resistant coating composition for paper consisting of from about 30 to about 50% of a rosin derivative liquid at ordinary temperatures, from about 45 to about 65% of a metallic rosinate, said rosinate having a melting point higher than ordinary rosin, and from about 6 to about 15% of a waxy substance, said percentages being based on the final constitution of the coating.

2. A moisture resistant coating composition for paper consisting of from about 30 to about 50% of an ester derivative of rosin liquid at ordinary temperatures, from about 45 to about 65% of a metallic rosinate, said rosinate having a melting point higher than ordinary rosin, and from about 6 to about 15% of a wax, said percentages being based on the final constitution of the coating.

3. A moisture resistant coating composition for paper consisting of from about 30 to about 50% of an ester derivative of rosin liquid at ordinary temperatures, from about 45 to about 65% of calcium rosinate, and from about 6 to about 15% of a wax, said percentages being based on the final constitution of the coating.

4. A moisture resistant coating composition consisting of from about 30 to about 50% of hydrogenated methyl abietate, from about 45 to about 65% of calcium rosinate, and from about 6 to about 15% of paraffin wax, said percentages being based on the final constitution of the coating.

5. A moisture resistant coating composition consisting of from about 30 to about 50% of decarboxylated rosin, from about 45 to about 65% of a metallic rosinate, said rosinate having a melting point higher than ordinary rosin, and from about 6 to about 15% of paraffin wax, said percentages being based on the final constitution of the coating.

DANIEL D. CAMERON.

REFERENCES CITED

The following references are of record in the file of this patent:

UNITED STATES PATENTS

| Number | Name | Date |
|---|---|---|
| 2,064,802 | Edgar | Dec. 15, 1936 |
| 1,960,176 | Weber et al. | May 22, 1934 |
| 2,146,034 | Sermattel | Feb. 7, 1939 |
| 2,142,039 | Abrams | Dec. 27, 1938 |
| 2,054,116 | Abrams et al. | Sept. 15, 1936 |
| 2,031,035 | Dreymann | Feb. 18, 1936 |
| 2,079,379 | Mitchell | May 4, 1937 |
| 2,069,823 | Driesin | Feb. 9, 1937 |
| 2,037,913 | Madenwald et al. | Apr. 21, 1936 |